(12) United States Patent
Zahlen et al.

(10) Patent No.: US 11,267,014 B2
(45) Date of Patent: Mar. 8, 2022

(54) DEVICE FOR LACQUER TRANSFER

(71) Applicant: Airbus Operations GmbH, Hamburg (DE)

(72) Inventors: Pierre C. Zahlen, Hamburg (DE); Alexander Gillessen, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 16/829,898

(22) Filed: Mar. 25, 2020

(65) Prior Publication Data
US 2020/0306785 A1    Oct. 1, 2020

(30) Foreign Application Priority Data
Mar. 29, 2019   (DE) .................... 10 2019 108 292.7

(51) Int. Cl.
*B05C 1/08*        (2006.01)
*B05C 11/04*      (2006.01)
*B05C 21/00*      (2006.01)

(52) U.S. Cl.
CPC .......... *B05C 1/0808* (2013.01); *B05C 1/0813* (2013.01); *B05C 1/0821* (2013.01); *B05C 11/04* (2013.01); *B05C 21/00* (2013.01)

(58) Field of Classification Search
USPC ................ 118/304, 211, 212, 641–643, 410; 425/174.4, 385, 62; 156/471–473
See application file for complete search history.

(56) References Cited

U.S. PATENT DOCUMENTS

| 5,425,848 | A  | 6/1995 | Haisma et al. |
| 6,174,567 | B1 | 1/2001 | Ueberschär et al. |
| 6,344,088 | B1 | 2/2002 | Kamkihara et al. |
| 6,554,900 | B1 | 4/2003 | Aydin et al. |

(Continued)

FOREIGN PATENT DOCUMENTS

| CN | 102 463 293 A | 5/2012 |
| DE | 10 84 469 B   | 6/1960 |

(Continued)

OTHER PUBLICATIONS

German Search Report for Application No. 10 2019 108 292.7 dated Dec. 9, 2019.

(Continued)

*Primary Examiner* — Yewebdar T Tadesse
(74) *Attorney, Agent, or Firm* — Jenkins, Wilson, Taylor & Hunt, P.A.

(57) ABSTRACT

A device for lacquer transfer includes a frame, a transfer roller with a circumferential lateral wall, a drive unit and a lacquer application unit. The lacquer application unit is mounted on the frame and applies lacquer to a work surface of a work piece while the device is moved in an application direction across the work surface. The drive unit drives the transfer roller in a rotation direction about an axis of rotation. An outside contact surface of the lateral wall comprises a plurality of depressions forming a predetermined structure. The transfer roller rolls with the outside contact surface on the work surface of the work piece for transferring the predetermined structure defined by the depressions in the outside contact surface to lacquer previously applied to the work surface by the lacquer application unit.

20 Claims, 1 Drawing Sheet

(56) References Cited

U.S. PATENT DOCUMENTS

| | | |
|---|---|---|
| 6,627,262 B1 | 9/2003 | Soas et al. |
| 9,808,823 B2 | 11/2017 | Pagendarm et al. |
| 10,173,238 B2 | 1/2019 | Sturm et al. |
| 10,335,824 B2 | 7/2019 | Mueller |
| 2001/0032585 A1 | 10/2001 | Koehn et al. |
| 2002/0108635 A1 | 8/2002 | Marrero |
| 2005/0061655 A1* | 3/2005 | Gros .............. C08G 18/792 204/157.6 |
| 2006/0066703 A1 | 3/2006 | Kadomatsu et al. |
| 2010/0080958 A1 | 4/2010 | Goelling |
| 2010/0233354 A1 | 9/2010 | Barral et al. |
| 2012/0148727 A1 | 6/2012 | Heo et al. |
| 2012/0313274 A1 | 12/2012 | Loukusa et al. |
| 2013/0341497 A1 | 12/2013 | Zuardy et al. |
| 2014/0305583 A1 | 10/2014 | Casset |
| 2015/0064389 A1 | 3/2015 | Zahlen et al. |
| 2015/0251409 A1 | 9/2015 | Ohnishi |
| 2015/0273762 A1 | 10/2015 | Okamoto |
| 2017/0080454 A1 | 3/2017 | Hidaka et al. |
| 2017/0095831 A1 | 4/2017 | Sturm et al. |
| 2017/0266691 A1 | 9/2017 | Travis |
| 2018/0281297 A1 | 10/2018 | Pringle et al. |
| 2020/0306786 A1 | 10/2020 | Zahlen et al. |
| 2020/0306787 A1 | 10/2020 | Zahlen et al. |
| 2020/0306791 A1 | 10/2020 | Zahlen et al. |
| 2020/0324310 A1 | 10/2020 | Zahlen et al. |
| 2020/0324315 A1 | 10/2020 | Zahlen et al. |
| 2020/0353498 A1 | 11/2020 | Kerger et al. |

FOREIGN PATENT DOCUMENTS

| | | |
|---|---|---|
| DE | 34 19 867 C1 | 9/1985 |
| DE | 37 21 593 A1 | 1/1989 |
| DE | 694 05 451 T2 | 3/1998 |
| DE | 699 10 430 T2 | 3/2004 |
| DE | 699 24 956 T2 | 9/2005 |
| DE | 20 2006 003 265 U1 | 6/2006 |
| DE | 10 2014 104 340 A1 | 10/2015 |
| DE | 10 2014 015 622 A1 | 4/2016 |
| DE | 20 2016 101 299 U1 | 6/2017 |
| DE | 10 2016 224 592 A1 | 6/2018 |
| EP | 0 408 283 A2 | 1/1991 |
| EP | 1 034 905 A2 | 9/2000 |
| EP | 1 117 488 B1 | 5/2004 |
| EP | 2 021 180 B1 | 11/2011 |
| EP | 3 248 692 A1 | 11/2017 |
| EP | 3 263 447 A1 | 1/2018 |
| EP | 2 632 605 B1 | 5/2019 |
| EP | 3 722 007 A1 | 10/2020 |
| EP | 3 722 009 A1 | 10/2020 |
| EP | 3 725 422 A1 | 10/2020 |
| EP | 3 725 539 A1 | 10/2020 |
| EP | 3 733 300 A1 | 11/2020 |
| EP | 3 750 637 A1 | 12/2020 |
| GB | 1 555 771 A | 11/1979 |
| JP | S 60250936 A | 12/1985 |
| JP | 63274748 A * | 11/1988 |
| JP | 2005-034740 A | 2/2005 |
| JP | 2006-026558 A | 2/2006 |
| JP | 2008-086882 A | 4/2008 |
| KR | 2001/0093377 A | 10/2001 |
| TW | 2011 03647 A | 2/2011 |
| WO | WO 89/11343 A2 | 11/1989 |
| WO | WO 99/60210 A1 | 11/1999 |
| WO | WO 02/026399 A1 | 4/2002 |
| WO | WO 2010/146998 A1 | 12/2010 |
| WO | WO 2015/064685 A1 | 5/2015 |
| WO | WO 2015/155128 A1 | 10/2015 |
| WO | WO 2018/150190 A1 | 8/2018 |

OTHER PUBLICATIONS

German Search Report for Application No. 10 2019 108 280.3 dated Jan. 29, 2020.
German Search Report for Application No. 10 2019 108 210.2 dated Jan. 30, 2020.
German Search Report for Application No. 10 2019 108 186.6 dated Jan. 31, 2020.
German Search Report for Application No. 10 2019 109 580.8 dated Feb. 11, 2020.
German Search Report for Application No. 10 2019 109 790.8 dated Feb. 12, 2020.
European Search Report for Application No. 20164755,9 dated Sep. 15, 2020.
European Search Report for Application No. 20164573.6 dated Sep. 15, 2020,.
European Search Report for Application No. 20164756.7 dated Sep. 21, 2020.
European Search Report for Application No. 20168066.7 dated Sep. 22, 2020.
European Search Report for Application No. 20166215.2 dated Sep. 7, 2020.
European Search Report for Application No. 20164300.4 dated Sep. 29, 2020.
Non-Final Office Action for U.S. Appl. No. 16/829,914 dated Jul. 21, 2021.
Non-Final Office Action for U.S. Appl. No. 16/844,132 dated May 13, 2021.
Non-Final Office Action for U.S. Appl. No. 16/829,925 dated Sep. 1, 2021.
Restriction Requirement for U.S. Appl. No. 16/843,112 dated Sep. 8, 2021.
Restriction Requirement for U.S. Appl. No. 16/829,880 dated Oct. 1, 2021.
Notice of Allowance for U.S. Appl. No. 16/844,132 dated Oct. 4, 2021.
Corrected Notice of Allowance for U.S. Appl. No. 16/844,132 dated Oct. 15, 2021.
Final Office Action for U.S. Appl. No. 16/829,914 dated Nov. 9, 2021.

* cited by examiner

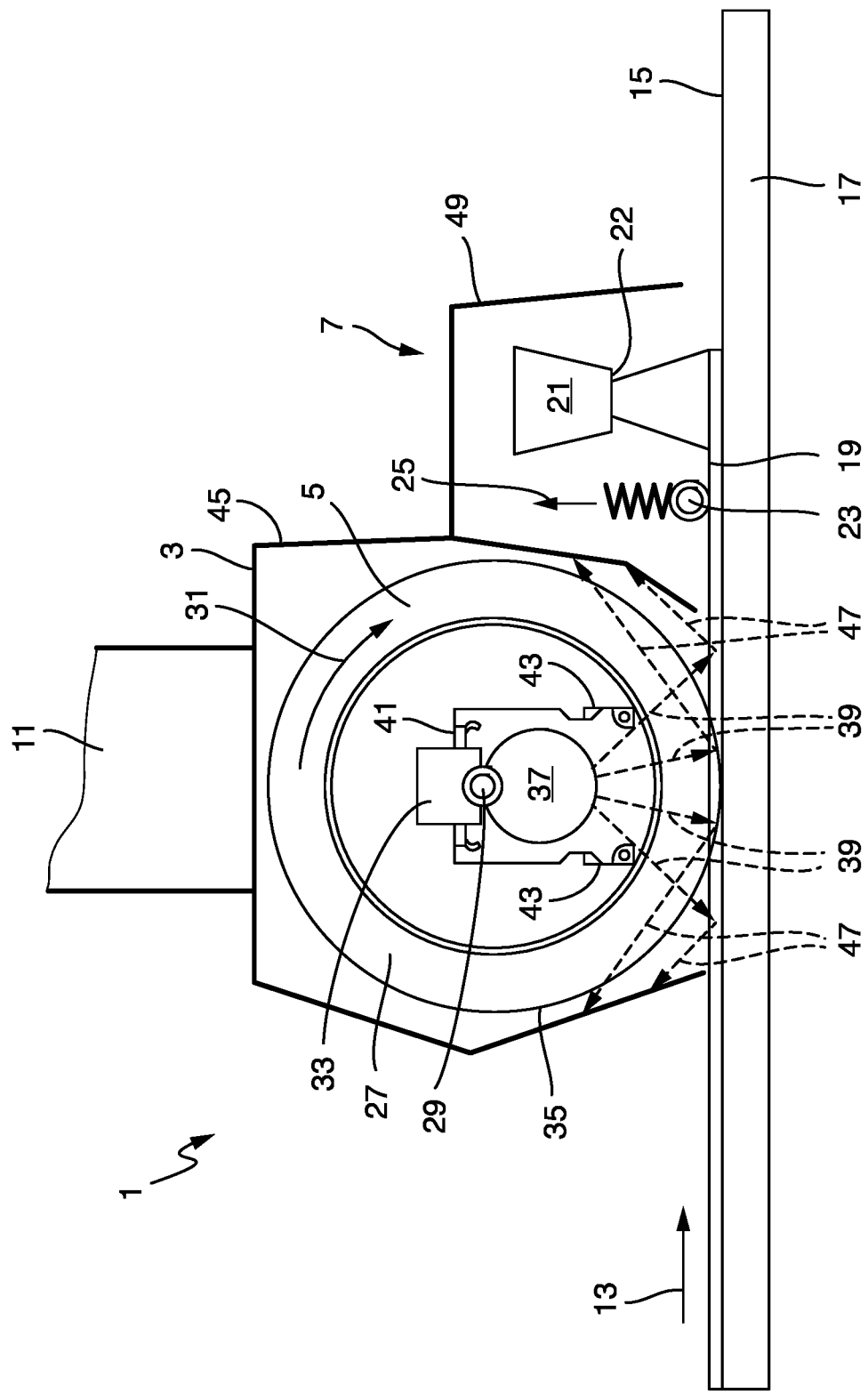

DEVICE FOR LACQUER TRANSFER

CROSS-REFERENCE TO RELATED APPLICATION

This application claims priority to German Patent Application No. 10 2019 108 292.7 filed Mar. 29, 2019, the entire disclosure of which is incorporated by reference herein.

TECHNICAL FIELD

The disclosure herein relates to a device for lacquer transfer comprising a frame, a transfer roller with a circumferential lateral wall, a drive unit and a lacquer application unit.

BACKGROUND

A device for a lacquer transfer is known from WO 2015/155 128 A1. The device disclosed therein is configured for transferring lacquer to a work surface of a work piece and referred to as an applicator. The device comprises a frame, a transfer roller, a lacquer application unit and a drive unit. The transfer roller is mounted rotatably about an axis of rotation at the frame and can be driven by the drive unit. In operation, the device is mounted to a robot arm and moved via the robot arm in parallel to the work surface, such that the driven transfer roller roles with an outside contact surface on the work surface. The outside contact surface of the transfer roller is contoured in that it is provided with depressions which are filled with lacquer that has been dispensed onto the outside contact surface. When the lacquer is transferred to the work surface from the contoured contact surface, a predefined lacquer structure is created on the work surface. The lacquer structure may, for example, be provided for reducing the resistance of air flowing across the work surface, thereby reducing drag.

The above device uses a transfer roller made of a flexible material. The transfer roller is pressurized so that the pressure exerted by the transfer roller onto the work surface can be controlled not only by the robot arm but also by varying the pressure in the transfer roller. Such a transfer roller allows creating a well-defined lacquer structure on an even or flat working surface when the rotation of the transfer roller is accurately synchronized with the speed or velocity in which the device is moved across the work surface by the robot arm.

SUMMARY

In view of the above it is an object of the disclosure herein to provide an improved device for lacquer transfer which can be used to create well-defined lacquer structures on different surfaces or with improved properties.

The object is achieved by a device for lacquer transfer as disclosed herein. Preferred embodiments of the device are disclosed herein.

The problem is solved by a device for lacquer transfer comprising a frame, a transfer roller with a circumferential lateral wall, a drive unit and a lacquer application unit. The lacquer application unit is mounted on the frame and is configured for applying lacquer to a work surface of a work piece while the device is moved in an application direction across the work surface. The drive unit is configured to drive the transfer roller in a rotation direction about an axis of rotation relative to the frame. An outside contact surface of the lateral wall comprises a plurality of depressions forming a predetermined structure. The transfer roller is mounted rotatably about the axis of rotation on the frame and configured to roll with the outside contact surface on the work surface of the work piece for transferring the predetermined structure defined by the depressions in the outside contact surface to lacquer previously applied to the work surface by the lacquer application unit.

In other words, the device for lacquer transfer comprises a frame to which a transfer roller and a lacquer application unit are attached so that they move with the frame when the frame is moved. In an exemplary preferred embodiment, the device is configured to be releasably connected to a handling device, such as a robot with a robot arm or a crane. In particular, the frame may be configured to be releasably connected to the robot arm. Thus, the device may be a mobile device, in particular a mobile mechanical device which is moved by the handling device in an application direction across a work surface.

The transfer roller is mounted on the frame such that it can be rotated relative to the frame about an axis of rotation. In order to control the speed and direction of rotation, a drive unit is provided which drives the transfer roller at a predetermined speed of rotation. The drive unit may, for example, be mounted directly or indirectly on the frame and arranged inside the transfer roller. The speed and direction may, in particular, be synchronized to a speed or velocity in which the entire device is moved by a handling device across a work surface such that an outer contact surface of the transfer roller essentially remains stationary in the application direction for the time in which it is in contact with the work surface avoiding any stick-and-slip effects that could degrade the quality of a structure created with the device.

The transfer roller comprises a circumferential lateral wall formed, for example, by a flexible silicone tire. An outer surface of the lateral wall, also referred to as an outside contact surface, comprises a plurality of depressions. The depressions form a predefined negative structure that shall be applied in positive to the work surface. For example, the depressions may form a saw tooth structure with each saw tooth extending parallel to an axis of rotation of the transfer roller.

The lacquer application unit is also mounted on the frame. It is provided to apply lacquer directly onto a working surface while the device is moved in the application direction. In other words, the lacquer application unit is moved across the work surface in the application direction and dispenses lacquer onto the work surface to cover the work surface over the width of the lacquer application unit with lacquer. Preferably, the lacquer application unit covers the work surface with a film of lacquer of constant thickness, i.e., the lacquer is homogenously distributed over the work surface.

Once lacquer has been applied to the work surface, the transfer roller is immediately rolled over the lacquer and the structure formed by the depression in the outside contact surface is embossed into the lacquer on the work surface. Hence, the predefined negative structure in the work surface is transferred onto the work surface where it is formed as a positive predetermined structure.

In other words, the lacquer application unit and the transfer roller are attached to the frame in a way that when the device is moved across a work surface in the application direction, the lacquer application unit travels ahead of the transfer roller. Lacquer is thereby applied to the work surface ahead of the transfer roller.

In the device according to the disclosure herein lacquer is advantageously directly applied to the work surface and not to the transfer roller. This has the advantage that a constant application of lacquer can be achieved even on complex shaped work surfaces. It has been noted by the inventors that applying lacquer to the transfer roller may be complicated on complex work surfaces as any change in the shape of the work surface results in a deformation of the flexible transfer roller at the work surface. However, the deformation is not limited to the portion of the transfer roller in contact with the work surface but translates to other areas of the transfer roller and, in particular, to the area where lacquer is applied to the transfer roller. However, if the distance between the transfer roller and the lacquer dispensing unit changes and the lacquer is directly dispensed on the outer contact surface, the thickness of the lacquer and the homogeneity of the distribution may change. This leads in turn to a reduction in the quality of the lacquer structure created on the work surface which is avoided with the present device.

In a preferred embodiment a light source emitting radiation for hardening the lacquer applied to the work surface is arranged inside the transfer roller, wherein the circumferential lateral wall of the transfer roller is formed from a material which is at least partly transparent to the radiation emitted by the light source and wherein the light source is arranged inside the transfer roller such that radiation emitted by the light source impinges on lacquer previously applied to the work surface at least in a region where the outside contact surface is in contact with the lacquer.

In other words, the device is particularly intended for transferring lacquer to a work surface which can at least partly be cured or hardened by radiation such as UV light emitted from a light source. Hardening is intended to occur only after or shortly before the structure has been embossed into the lacquer and, preferably, as soon as the structure has been embossed and while the transfer roller is still in contact with the lacquer. To this end, a light source which emits radiation that at least partly cures the lacquer is arranged inside the transfer roll and at least the outer contact surface is made of a material that is at least partly transparent to the radiation. Hence, the radiation is transmitted from the light source trough the outer contact surface where it comes into contact with the lacquer previously applied to the working surface. This can, in particular, be achieved in a region where the transfer roller is in contact with the lacquer and the distance between the light source and the lacquer is particularly short. As compared to a device in which the lacquer is applied to the transfer roller itself, hardening of the lacquer only occurs after it has been applied to the work surface. This enables a more homogenous distribution of lacquer on uneven or complex surfaces.

The radiation emitted from the light source is in a preferred embodiment in the ultraviolet spectrum. However, radiation in other frequency or wavelength ranges may also be used.

In a preferred embodiment the device comprises a shielding which is not transparent to the radiation emitted from the light source, wherein the shielding is arranged between the transfer roller and the lacquer application unit in order to limit the amount of radiation that impinges on lacquer applied to the work surface before the transfer roller comes into contact with the lacquer. The shielding is provided such that the lacquer is hardened as little as possible before the predefined structure is embossed into the lacquer to create the predefined structure with a high precision. The shielding can be provided to reduce the amount of both direct and indirect radiation emitted from the light source.

The shielding is preferably formed by a housing of the transfer roller which can, for example, be part of the frame.

In a preferred embodiment the lacquer application unit comprises a slit nozzle having a slit extending parallel to the axis of rotation of the transfer roller. The slit nozzle may, for example, be formed by multiple elements which can, for example, be activated independently of each other so that areas of different sizes can be cover with lacquer. Further, the direction in which lacquer is dispensed from the nozzle may also be adjustable to apply the lacquer to complex shaped work surfaces.

The lacquer is preferably dispensed by the slit nozzle directly onto the work surface. However, in an alternative embodiment the lacquer is dispensed by the slit nozzle onto a lacquer application roller transferring the lacquer from the slit nozzle to the work surface.

In a further preferred embodiment a device for controlling a thickness of lacquer applied to the work surface is arranged between the lacquer application unit and the transfer roller in order to provide a homogenous distribution of lacquer with a constant thickness on the work surface. The device for controlling a thickness of lacquer is preferably a doctor blade, a doctor roller or a soft lip scraper. However, the use of such a device is optional and it may also be possible to achieve a homogenous distribution of lacquer by directly spraying the lacquer onto the work surface.

BRIEF DESCRIPTION OF THE DRAWING

In the following the disclosure herein will be described in more details with reference to an exemplary embodiment of a device shown in the drawing, wherein:

FIG. 1 shows a sectional view of an embodiment of a device for lacquer transfer.

DETAILED DESCRIPTION

The device 1 for lacquer transfer shown in FIG. 1 comprises a frame 3, a transfer roller 5 and a lacquer application unit 7. Both the transfer roller 5 and the lacquer application unit 7 are mounted to the frame 3 although the connection between the frame 3 and the other elements 5, 7 is not shown in the sectional drawing of FIG. 1.

The frame 3 can be releasably connected to a handling device (not shown), for example, in form of a robot with a robot arm 11. The latter is shown partially in FIG. 1 and is used to move the device 1 in an application direction 13 across a work surface 15 of a work piece 17. The work piece 17 may, for example, be a wing or a control surface of an aircraft and the work surface 15 is an outer surface of the wing or the control surface that is subjected to air flow when the aircraft is flying.

While the handling device 11 moves the device 1 in the application direction 13, lacquer 19 is dispensed directly onto the work surface 15 by the lacquer application unit 7. To this end the lacquer application unit 7 comprises an extended slit nozzle 21 having a muzzle 22 that points in a direction extending perpendicularly to a plane of the work surface 15. Preferably, the angle of the muzzle 22 relative to the frame 3 can be adjusted to accommodate uneven or other complex shaped surfaces. It is possible to form the slit nozzle from multiple separate elements such that the width over which lacquer 19 is dispensed by the device 1 can be modified by turning individual elements on and off. Instead of a slit nozzle it may, for example, also possible to use a spray nozzle.

Applying the lacquer 19 directly onto the work surface 15 has the advantage that even complex work surfaces 15 with changing curvatures or steps can be covered homogeneously with wet or liquid lacquer 19. This stands in contrast to systems were lacquer is first applied to a transfer roller and may already be partly cured or hardened before it comes into contact with the work surface 15. Compared to these systems, the interface between the lacquer 19 and the work surface 15 is improved as there are fewer bubbles and a more homogeneous lacquer distribution can be achieved.

The lacquer application unit 7 further comprises a device 23 for controlling the thickness of the lacquer 19 in form of a doctor roller 23. As indicated by an arrow 25 pointing perpendicular to the work surface 15, the doctor roller 23 is biased by a spring 27 towards the work surface 15 and exerts a constant force onto the lacquer 19 such that the lacquer 19 is distributed homogenously on the work surface 15. The spring 27 is mounted on the frame 3 which is, however, not shown in FIG. 1.

It should be noted that the use of a device 23 for controlling the thickness of the lacquer 19 is optional and may not be necessary if a homogenous distribution of lacquer 19 can already be achieved by the lacquer application unit 7.

The transfer roller 5 comprises a lateral wall 27 which is formed by an inflated tire 27. The pressure in the inflated tire 27 can be modified to control the pressure that is exerted by the transfer roller 5 onto the work surface 15 and the lacquer 19.

The entire transfer roller 5 is rotatably mounted to the frame 3. It can be rotated about an axis of rotation 29 and rotates in operation in a direction of rotation 31. In order to set the transfer roller 5 into rotation, a drive unit 33 is provided inside the transfer roller 5 and directly or indirectly attached to the frame 3. The drive unit 33 is used to control the speed of rotation of the transfer roller 5 so that it matches the velocity or speed with which the device 1 is moved in the application direction 13. If the speed of rotation and the speed in the application direction 13 match, an outer contact surface 35 remains essentially stationary in the application direction 13 while in contact with the lacquer 19. This improves the quality of a structure embossed by the transfer roller 5 into the lacquer 19 as there are no stick-and-slip effects that could smear out the structure.

The outer contact surface 35 of the lateral wall 27 comprises a plurality of depressions which define a negative structure to be embossed into the lacquer 19. In other words, the arrangement of the depressions or the outer shape or contour of the outer contact surface 35 defines the structure to be applied to the work surface 15 using the device 1 for lacquer transfer. The depressions may also be referred to as a microstructure.

In order to harden or cure the lacquer 19 as soon as the structure has been embossed, an ultraviolet (UV) light source 37 is arranged inside the transfer roller 5. The UV light source 37 emits radiation in the UV spectrum as indicated by the dotted arrows 39. Since the lateral wall 27 is made from a material that is at least partially and preferably fully transparent to UV radiation, the UV radiation is transmitted through the lateral wall 27 and the outer contact surface 35 and impinges on the lacquer 19 which has previously been applied to the work surface 15 by the lacquer application unit 7. When the UV radiation impinges on the lacquer 19, a chemical reaction is triggered and the lacquer 19 begins to harden.

The UV light source 37 is arranged in a housing 41 with a shutter 43 which are both nontransparent to UV radiation and form a first shielding 41, 43 that limits the area of the lacquer that is irradiated or illuminated by the UV radiation. The area that is illuminated is further restricted by providing a housing 45 for the transfer roller 3 which is also nontransparent for UV radiation. The housing forms a second shielding 45 that reduces in particular the amount of scattered UV radiation 47 that could be scattered back onto the lacquer 19.

As can be seen in FIG. 1 by the first and second shielding 41, 43, 45 the area in which UV radiation impinges onto the lacquer 19 is confined to an area shortly before and after the area in which the transfer roller 5 is in contact with the lacquer 19. Hence, the lacquer is only hardened shortly before, while and after the structure has been embossed into the lacquer 19 which improves the quality of the embossed structure. Also, as compared to previous device where lacquer is applied to the transfer roller 5, hardening of the lacquer before it is applied to the work surface 15 is avoided. This improves the adherence between the lacquer 19 and the work surface 15 and therefore the robustness of the structure.

Finally, it should be noted that also the lacquer application unit 7 is provided with a housing 49 that prevents environmental UV radiation from interacting with lacquer 19 after it has been applied to the work surface 15.

In operation, the device 1 is moved across the work surface 15 in the application direction 13 by the robot arm 11. First, lacquer 19 is dispensed onto the work surface 15 by the lacquer application unit 7 and, in particular, the slit nozzle 21. The recently applied lacquer 19 is then evenly distributed and limited to a predefined thickness by a doctor roller 23, though this step may be omitted. Afterwards, the transfer roller 5 is rolled over the lacquer 19 such that depressions formed in the outer contact surface 35 of the lateral wall 27 of the transfer roller 5 emboss a predefined structure into the lacquer 19. In this way, the structure is transferred from the transfer roller 5 to the work surface 15. At the same time UV radiation 39 emitted by the UV light source 37 at least partially cures the lacquer 19 to preserve the recently embossed structure. The device 1 therefore provides an efficient way of applying lacquer 19 with a predefined structure onto a work surface 15 that may be of complex shape.

For the sake of completeness it is pointed out that the depression in the outer contact surface 35 and the microstructure embossed into the lacquer 19 are not shown in the drawing.

While at least one example embodiment of the invention(s) herein is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:
1. A device for lacquer transfer, the device comprising:
a frame;
a transfer roller with a circumferential lateral wall, which has an outside contact surface that comprises a plurality of depressions forming a predetermined structure;

a drive unit configured to drive the transfer roller in a rotation direction about an axis of rotation relative to the frame;

a lacquer application unit, which is mounted on the frame and is configured for applying lacquer to a work surface of a work piece while the device is moved in an application direction across the work surface; and a light source, which is configured for emitting radiation for hardening the lacquer applied to the work surface, wherein the light source is arranged inside the transfer roller, such that radiation emitted by the light source impinges on the lacquer previously applied to the work surface by the lacquer application unit at least in a region where the outside contact surface is in contact with the lacquer;

wherein the transfer roller is mounted rotatably about the axis of rotation on the frame and is configured to roll with the outside contact surface on the work surface of the work piece for transferring the predetermined structure defined by the depressions in the outside contact surface to the lacquer previously applied to the work surface by the lacquer application unit; and wherein the circumferential lateral wall of the transfer roller is formed from a material which is at least partly transparent to the radiation emitted by the light source.

2. The device of claim 1, wherein the radiation emitted from the light source is in an ultraviolet spectrum.

3. The device of claim 2, comprising a shielding, which is not transparent to radiation emitted from the light source and is arranged between the transfer roller and the lacquer application unit in order to reduce an amount of radiation that impinges on the lacquer applied to the work surface before the lacquer is contacted by the transfer roller.

4. The device of claim 3, wherein the shielding comprises a housing of the transfer roller.

5. The device of claim 1, wherein the lacquer application unit comprises at least one slit nozzle for dispensing lacquer.

6. The device of claim 5, wherein the lacquer is dispensed by the slit nozzle directly onto the work surface.

7. The device of claim 5, wherein the lacquer is dispensed by the slit nozzle onto a lacquer application roller for transferring the lacquer from the slit nozzle to the work surface.

8. The device of claim 1, comprising a lacquer thickness control device, which is configured to control a thickness of the lacquer applied to the work surface and is arranged between the lacquer application unit and the transfer roller in order to provide a homogenous distribution of lacquer with a constant thickness on the work surface.

9. The device of claim 8, wherein the lacquer thickness control device is a doctor blade, a doctor roller, or a soft lip scraper.

10. The device of claim 1, comprising a shielding, which is not transparent to radiation emitted from the light source and is arranged between the transfer roller and the lacquer application unit to reduce an amount of radiation that impinges on the lacquer applied to the work surface before the lacquer is contacted by the transfer roller.

11. The device of claim 10, wherein the shielding comprises a housing of the transfer roller.

12. The device of claim 10, wherein the radiation emitted from the light source is in an ultraviolet spectrum.

13. The device of claim 10, wherein the lacquer application unit comprises at least one slit nozzle for dispensing lacquer.

14. The device of claim 13, wherein the lacquer is dispensed by the slit nozzle directly onto the work surface.

15. The device of claim 13, wherein the lacquer is dispensed by the slit nozzle onto a lacquer application roller for transferring the lacquer from the slit nozzle to the work surface.

16. The device of claim 13, comprising a lacquer thickness control device, which is configured to control a thickness of the lacquer applied to the work surface and is between the lacquer application unit and the transfer roller in order to provide a homogenous distribution of lacquer with a constant thickness on the work surface.

17. The device of claim 16, wherein the lacquer thickness control device is a doctor blade, a doctor roller, or a soft lip scraper.

18. The device of claim 10, comprising a lacquer thickness control device, which is configured to control a thickness of the lacquer applied to the work surface and is between the lacquer application unit and the transfer roller to provide a homogenous distribution of lacquer with a constant thickness on the work surface.

19. The device of claim 18, wherein the lacquer thickness control device is a doctor blade, a doctor roller, or a soft lip scraper.

20. The device of claim 19, wherein the radiation emitted from the light source is in an ultraviolet spectrum.

* * * * *